Patented Aug. 30, 1949

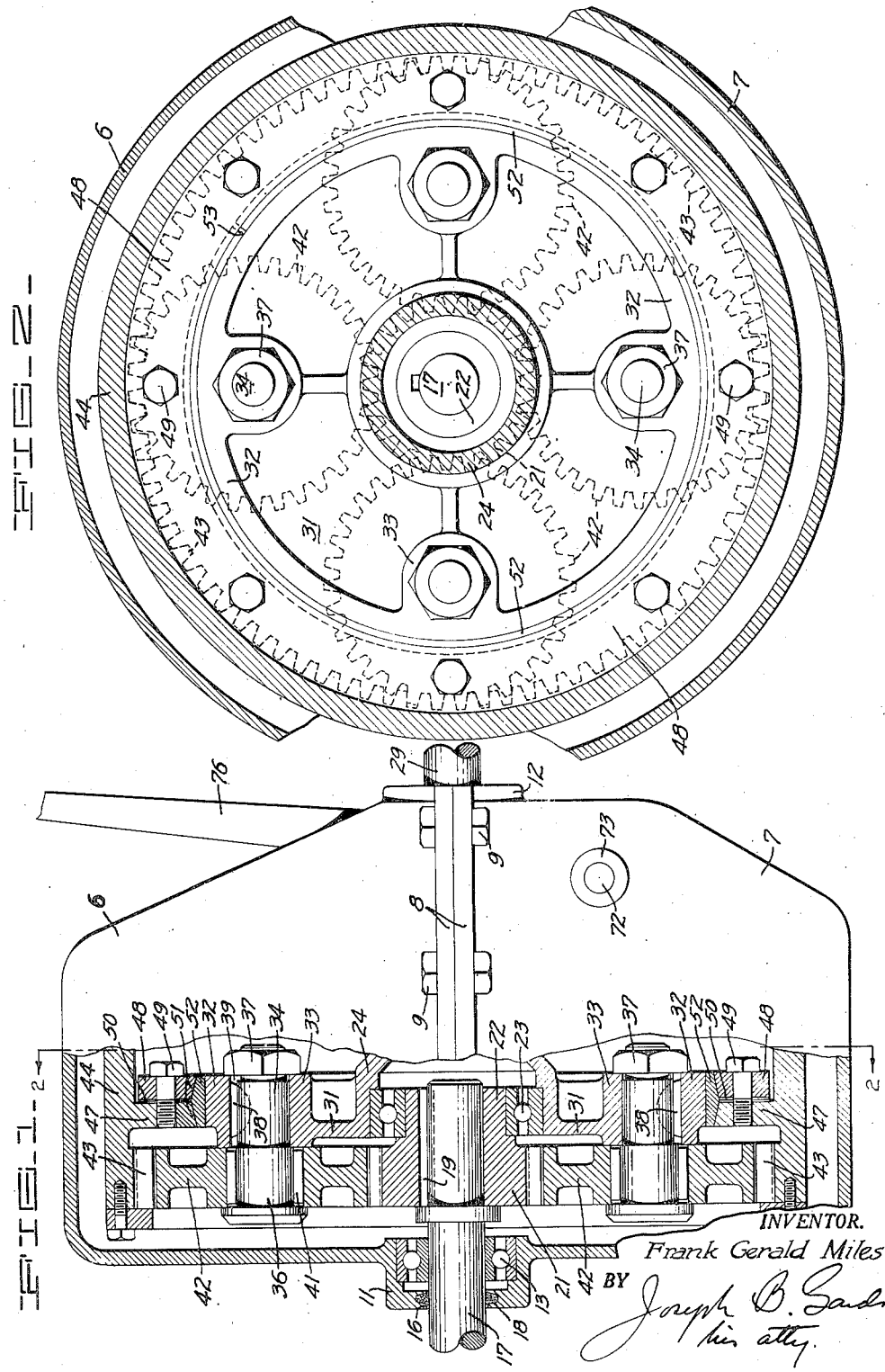

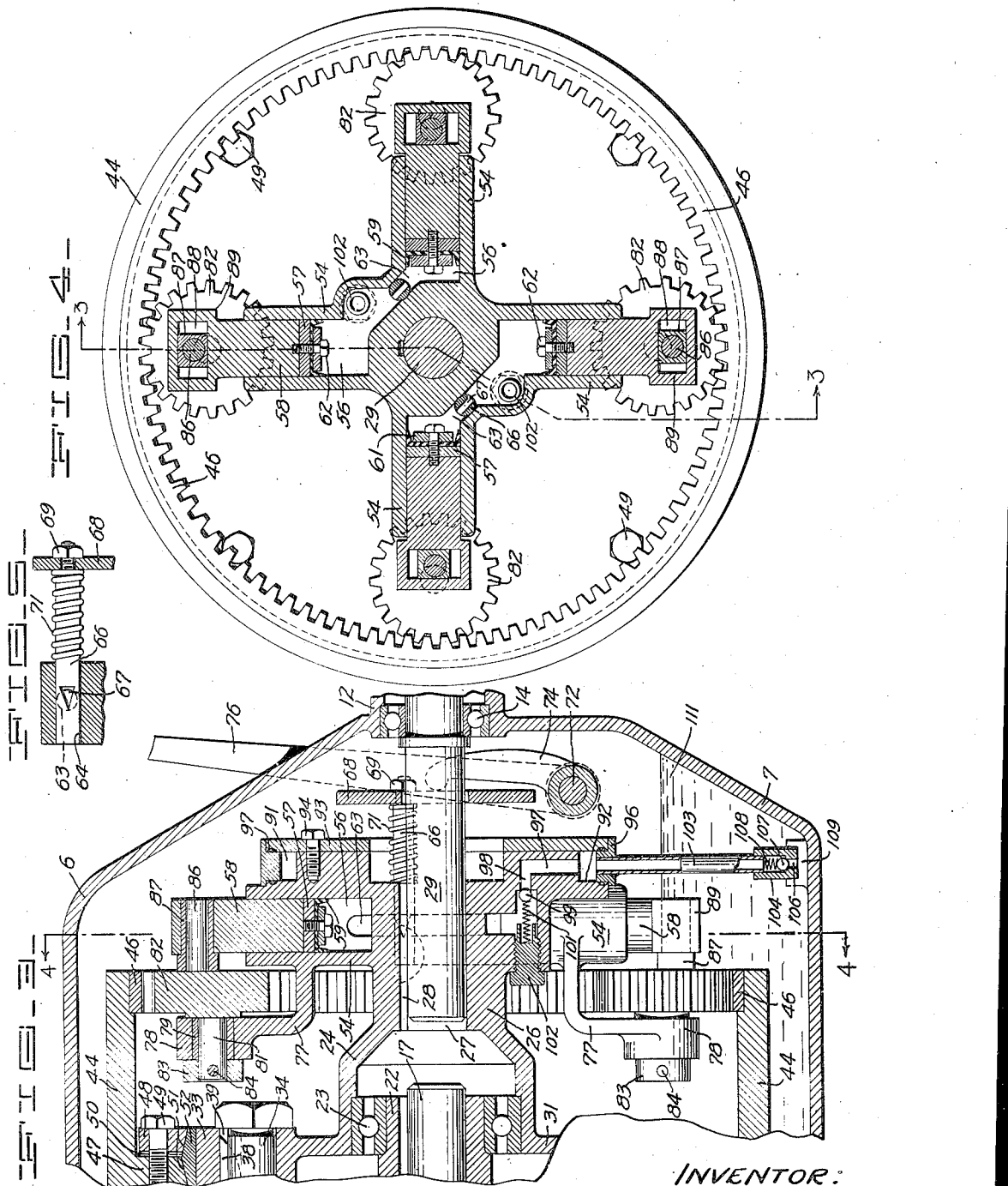

2,480,193

UNITED STATES PATENT OFFICE 2,480,193

POWER TRANSMISSION

Frank G. Miles, Oakland, Calif.

Application March 2, 1946, Serial No. 651,546

12 Claims. (Cl. 74—774)

This invention relates to apparatus for operatively connecting drive and driven members and for establishing variable rotational relationships therebetween.

An object of the invention is to provide a constant-torque transmission having control means providing a selective variation in ratio between unity and infinity.

Another object of the invention is to provide an hydraulic type variable ratio transmission in which smoothness of operation is effected by the provision, between the drive and driven elements thereof, of relatively reciprocable coupling members arranged to cycle several times for each relative rotational cycle between the drive and driven elements.

A further object of the invention is to provide, in apparatus of the character described provided with variable flow liquid cycling circuits, means for automatically replenishing any reduction of volume which may occur in said circuits due to leakage or to other reasons.

Still another object of the invention is to provide a transmission of the character described incorporating reciprocable fluid displacement elements which are so arranged that during their operation no gyrational unbalance in the apparatus exists which would cause objectionable transaxial vibration in the apparatus.

A still further object of the invention is to provide a transmission of the type referred to which is designed as a compact unit capable of being readily inserted as an addition in existing power transmission mechanisms so as to extend the range and flexibility of the latter.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 1 is a view, partly in side elevation and partly in vertical section, of the transmission of my invention. The sectional portion of the view is taken through planetary gear system.

Figure 2 is a vertical sectional view taken in the plane indicated by the line 2—2 of Figure 1.

Figure 3 is a vertical sectional view of the rear portion of the transmission mechanism. The plane of section is indicated by the line 3—3 of Figure 4.

Figure 4 is a vertical sectional view taken in the plane indicated by the line 4—4 of Figure 3.

Figure 5 is a fragmental vertical sectional view taken in the longitudinal axial plane of the control valve also shown in Figure 3.

In detail, I provide a housing comprising upper and lower semi-circular sections 6 and 7 respectively provided in their chordal planes with marginal flanges 8 connected together by means of bolts 9. The respective sections 6 and 7 have axially concentric projections extending therefrom which, when the sections are secured together, form hubs 11 and 12 providing mountings for bearings 13 and 14. Disposed in the bearing 13 and extending exteriorly of the housing through an aperture 16 formed in the hub 11, is a drive shaft 17 which is connected with and to be rotated by a suitable power source. A conventional grease retainer 18 is provided in the aperture 16 for preventing leakage of lubricant from the bearing 13 or the housing. Secured by a key 19, or otherwise, to the inner end of the drive shaft 17 is the center gear 21 of a planetary gear system which is provided with a shouldered hub 22 carrying a bearing 23 mounted in the recessed hub 24 of a rotor 26. The rotor 26 is provided with a central bore 27 in which is secured by a key 28, or otherwise, a driven shaft 29 which is co-axial with the drive shaft 17, and which extends from the housing through the bearing 14 to be connected with the apparatus to be driven. The drive shaft 17, it will be seen, is rotatable independently of the driven shaft 29. Formed integrally with and extending radially from the hub 24 is a circular flange 31 having a peripheral rim 32 and provided with circumferentially spaced hubs 33, each of which is bored to receive the stem 34 of a headed stud shaft 36. The stem 34 is preferably secured in the hub 33 by a nut 37 engaging the threaded projection of the stem and by a key 38 seated in a mating keyway 39 provided therefor in the hub bore. Journaled on each stud shaft 36, by means of roller or needle-type bearings 41, is a planet gear 42 meshing with the center gear 21 and with a ring gear 43 formed on or carried by one end of an annulus 44 positioned in axial concentricity with the common axis of the drive and driven shafts. The opposite end of the annulus is provided with a similar ring gear 46 and a flange 47, positioned intermediate the ends of the annulus, has a ring 48 coaxial with and secured thereto by bolts or screws 49. A group of laminated shims 50 is interposed between the confronting faces of the flange and ring. The inner peripheral faces 51 of the flange 47 and ring 48 are each correspondingly inclined toward each other to form a V-shaped seat in which is retained a bearing bushing 52 journaling the rim 32 of the rotor, and the ring is split by a slot 53 as shown in Figure 2. The construction of that portion of the mechanism just described is such that by removing one or more of the shims, of the group 50 thereof, replacing the ring 48 and tightening the bolts or screws 49, the bushing 52 may be diametrically compressed so as to take up wear which may occur in the bushing or in the cooperating face of the rim 32.

Referring to Figures 3 and 4, the rotor 26 has thereon preferably four equidistantly spaced radially extending cylinders 54 each having a bore 56 therein in which is slidably disposed a piston 57 and a plunger 58 of corresponding diameter. The piston, which is engaged by the end of the plunger is provided with a cup leather head 59 held in place by a washer 61 and mounting screw 62. The purpose of the construction, whereby the piston is separated from the plunger, is to prevent transmission to the piston of any degree of rocking movement of the plunger in the cylinder which wear will eventually create. This lessens the danger of fluid leakage from the cylinder past the cup leather or piston and materially extends the periods through which the apparatus will function satisfactorily without servicing. The cylinders 54, as will be seen in Figure 4, are arranged in adjacent cooperative pairs, the bores 56 of which are joined by passages 63 so that communication may be had between the cylinders. As is best shown in Figure 5, each passage 63 is transaxially traversed by a bore 64 forming a slidable guide for a cylindrical plunger 66 having a triangularly shaped port 67 extending diametrically therethrough, the latter being registrable with the passage, when the plunger is moved to a predetermined position, to fully open the passage and to establish full communication between the related pair of cylinders. An annular disk 68, concentric with and movable axially of the drive shaft 29, is attached to the outer end of each plunger 66 by a nut 69 and springs 71 are provided surrounding the plungers and interposed between the rotor 26 and the disk 68 so as to normally urge the port 67 out of registry with the passage 63 and fully close the latter, thus relatively isolating the respective cylinders of the groups thereof. A control shaft 72 extending laterally of the lower housing section 7 and journaled in bearings 73 provided in the wall thereof, carries a pair of radially extending fingers 74 bearing against and at diametrically opposed points on the surface of the disk 68, and the shaft is further provided, exteriorly of the housing, with an upwardly extending control lever 76 manually movable by the operator of the mechanism. It will be understood that the cylinders 56 and the passages 63 connecting the related pairs thereof are completely filled with liquid which, preferably, is light machine oil. It will be seen therefore, by reference to Figure 4, that any movement of a piston in a cylinder will cause a corresponding opposite movement of the piston in the other cylinder through the medium of movement of a portion of the liquid mass through the passage 63. It will also be seen that the position of the valve port 67 relative to the passage 63 will govern the velocity at which the displaced liquid may flow therethrough, a full registry of the port and passage producing a minimum resistance to flow while other degrees of registry will effect a resistance to flow depending upon the amount of overlap.

The pistons are adapted to be reciprocated in the cylinders so as to effect variable degrees of torque transmission from the drive shaft 17 to the driven shaft 29. Extending from a suitable portion of the rotor, herein shown as a side of each cylinder, is an arm 77, one of which is provided for and positioned adjacent each cylinder, the outer end of the arm being provided with a hub 78 fitted with a bushing 79 which journals a stub shaft 81 formed concentrically with and extending from a spur gear 82 whose teeth are in mesh with those of the ring gear 46. A collar 83 secured to the shaft 81 by a pin 84, or otherwise, serves to retain the shaft in the hub 78. Secured in and extending from the face of the gear 82 opposite the shaft 81 is a crank pin 86 radially offset from the rotational axis of the gear and having journaled thereon a block 87 of rectangular cross-sectional form extending through and slidable in a slot 88 provided in a loop 89 formed at the upper end of and integral with each of the plungers 58. It will be seen that movement of the rotor 26 relative to the annulus 44 will effect rotation of the gears 82 so that the plungers 58 and pistons associated therewith will be reciprocated in the cylinders to cause reversals of flow of the liquid through the passages 63 and past the valves 66.

Means is provided for replenishing the volume of liquid in the cylinders and passages should such volume be reduced by a leakage in the cylinders or past the valves 66. The end of the rotor facing the valve control disk 68 is provided with an annular channel 91 formed by a turned shoulder 92 on the rotor and by an annular side plate 93 attached to the rotor, in concentric relation therewith, by means of tapscrews 94. A closure ring 96 is engaged in and closes a side of the channel 91 and is arranged for sliding movement relative thereto when the rotor revolves. Seals comprising felt rings 97 confined in annular grooves formed in the shoulder 92 and in the side plate 93 press against the sides of the ring 96 so as to preclude leakage of liquid from the channel 91. Diametrically opposed radially extending drilled passages 97 are provided opening into the channel 91 and connected by branch passages 98 into the passages 63 extending between the pairs of coacting cylinders 56. Ball check valves 99 normally close the ends of the branch passages 98, where the latter enter the passages 63, and are resiliently maintained in position by springs 101 interposed between the ball valves and recessed screw plugs 102 tapped into suitable threaded apertures provided therefor in the rotor and axially aligned with the passages 98. A rigid conduit 103 extending through and radially from the ring 96, has a tubular head 104 provided with a port 106 at its lower end which is normally closed by an upwardly opening ball check valve 107 urged against its seat by a compression spring 108 interposed between the ball valve and the lower end of the conduit 103. The head 104 is confined between a pair of spaced lugs 109 rising from the inner wall surface of the housing section 7 so that the ring 96 will be held against rotation as the rotor 26 and its associated mechanism revolves. The lower housing section also serves as a sump for holding a quantity of oil 111 in which the head 104 is submerged and which serves as a bath through which the rotating parts of the apparatus may pass to maintain their lubrication.

In tracing the operation of the apparatus, let us assume that the drive shaft 17 is connected to a suitable source of power, by means of the shaft may be forcibly rotated, that the driven shaft 29 has a load thereon which the motor or other source of power is required to drive and that the valve ports 67 are in full registry with the passages 63 so that a minimum of resistance to flow of liquid therethrough is afforded. With the valves wide open, the pistons will be free to reciprocate in the cylinders and, consequently, the gears 82 will be free to rotate. Thus, rotation of the shaft 17 will cause a corresponding rotation of the center gear 21. The planet gears 42, due to their engagement with the center gear will also be rotated and will impart a rotation, opposite to that of the center gear, to the ring gear 43. Since the two ring gears 43 and 46 are carried by the annulus 44, any rotary movement of one ring gear will be duplicated by the latter. Thus the gears 82 and plungers 58 together with their associated pistons 57, since the latter elements are movable unrestrictedly, will operate under the action of the rotating ring gear 46. It will thus be seen that since the ring gears are capable of free rotation, no motion will be imparted to the rotor 26 or to the load-resisted driven shaft 29 with which the rotor is connected. Upon actuation of the control lever 76, however, to partially close the valves, a resistance to flow of the liquid through the passages 63 will be introduced. The free movement of the plungers and pistons in the cylinders will be thus retarded and a resistance to rotation of the gears 82 will be set up. This will cause the gears 82 to orbitally follow the rotating ring gear 46, to resist the free rotation of the latter, and correspondingly rotate the rotor 26 and the driven shaft 29 at a reduced speed proportionate to the degree of braking action applied to the ring gear 43 by the fluid-resisted pistons 58. It should be noted here that the relative movements between the gears 82 and the ring gear 46, and between the planet gears 42 and the ring gear 43 are equal. This serves to prevent torque transmission through the cylinders and plungers and through the gears 82, this being accomplished entirely by the center gear 21, planet gears 42 and ring gear 43. The function of the ring gear 46 and gears 82 therefore is solely to provide for reciprocating movement of the plungers and pistons. By continuing to close the valves, the flow of liquid between the related pairs of cylinders will become more and more restricted resulting in the orbital speed of movement of the gears 82 approaching that of the ring gear 46 until, with the valves fully closed, no reciprocation of the plungers or pistons may occur and consequently the shafts 17 and 29 are connected together for duplicate rotational movement. It will therefore be seen that the rotational ratios between the drive and driven shafts may be varied from unity downwardly toward infinity wherein no torque transmission may occur between the drive and driven shafts even though the former is being power driven.

As was stated above, the cylinders 56 and the passages 63 are normally maintained full of liquid. However, due to slight leaks in the cylinders or in the passage closures, the quantity of liquid may become slightly depleted which, if not corrected, may result in the introduction of air into the system which would impair the efficient operation of the transmission mechanism. When such a depleted fluid condition obtains, the pistons in their reciprocations will create a suction in the depleted system which will draw replenishing liquid from the channel 91 through the check valves 99 into the system. Whatever liquid is drawn from the channel 91 will be replaced by liquid raised from the sump through the valve 107 and conduit 103 into the channel in response to the lowered pressure existing in the channel 91.

An additional important feature of the invention, as will be understood by reference to Figure 4, is the synchronization of movement of opposed plungers 58 so that no radial unbalance exists in the rotating mass. Maintenance of such balance permits the device to be rotated at comparatively high speeds without introducing appreciable transaxial vibration.

The transmission apparatus of my invention has been described as though the drive shaft was reversible so that a selection in directional rotation of the driven shaft may be had. However, in certain installations, such as motor vehicles, the drive shaft of the engine is confined to unidirectional rotation in which case a separate reverse gear would have to be interposed between the engine and the apparatus of my invention. A separate clutch would not be necessary since the apparatus itself functions as and may serve as a clutch.

I claim:

1. In a power transmission, relatively rotatable drive and driven shafts, a rotor carried by and rotatable with said driven shaft, said rotor having therein a plurality of cylinders arranged in associated pairs, the cylinders of each pair thereof being in relative communication through a connecting passage, an annulus journaled on and rotatable relative to said rotor, gearing interposed between the drive shaft and annulus whereby the latter may be rotatably driven by and upon rotation of said drive shaft, plungers including separate pistons reciprocably movable in said cylinders to transfer liquid in said cylinders therebetween through said connecting passages, means actuated by relative rotary movement between said annulus and said rotor for reciprocating said plungers and pistons in said cylinders, and means for variably restricting said passages to regulate the flow of liquid therethrough.

2. In a power transmission, relatively rotatable drive and driven shafts, a rotor carried by and rotatable with said driven shaft, said rotor having therein a plurality of cylinders arranged in associated pairs, the cylinders of each pair thereof being in relative communication through a connecting passage, an annulus journaled on and rotatable relative to said rotor, said annulus having a ring gear thereon, a center gear carried by and rotatable with said drive shaft, planet gears carried by said rotor and meshing with said center gear and ring gear respectively, plungers including separate pistons reciprocably movable in said cylinders to transfer liquid in said cylinders therebetween through said connecting passages, means actuated by relative rotary movement between said annulus and said rotor for reciprocating said plungers and pistons in repeated cycles during each relative rotational cycle between said annulus and said rotor, and means for controlling the flow of liquid through said passages.

3. In a power transmission, relatively rotatable drive and driven shafts, a rotor carried by and rotatable with said driven shaft, said rotor having therein a plurality of cylinders arranged in associated pairs, the cylinders of each pair thereof being in relative communication through a connecting passage, an annulus journaled on and rotatable relative to said rotor, gearing interposed between the drive shaft and annulus wherebly the latter may be rotatably driven by and upon rotation of said drive shaft, plungers including separate pistons reciprocably movable in said cylinders to transfer liquid in said cylinders therebetween through said connecting passages, rotary means on said rotor connected with and for reciprocating said plungers and pistons in said cylinders, said rotary means being actuated by relative rotary movement between said annulus and said rotor, and means for variably closing said passages to restrict the flow therethrough of liquid between cylinders of said related pairs thereof.

4. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus journaled on said rotor rim whereby the annulus and rotor are arranged for relative rotational movement, a ring gear on and rotatable with said annulus, a center gear carried by and rotatable with said drive shaft, planet gears journaled on said rotor and meshing with said ring gear and center gear respectively, means for regulating the rotation of the ring gear relative to the center gear whereby said rotor will be revolved at an intermediate rotational speed, said means comprising plungers including separate pistons reciprocably movable in said cylinders to transfer liquid contained in said cylinders therebetween through said interconnecting passages, means actuated by relative rotary movement between said annulus and rotor for reciprocating said plungers and pistons, and valves carried by the rotor and traversing said passages for variably controlling the flow of liquid therethrough between said cylinders.

5. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus journaled on said rotor rim whereby the annulus and rotor are arranged for relative rotational movement, a ring gear on and rotatable with said annulus, a center gear carried by and rotatable with said drive shaft, planet gears journaled on said rotor and meshing with said ring gear and center gear respectively, means for regulating the rotation of the ring gear relative to the center gear whereby said rotor will be revolved at an intermediate rotational speed, said means comprising plungers including separate pistons reciprocably movable in said cylinders to transfer liquid contained in said cylinders therebetween through said interconnecting passages, means actuated by relative rotary movement between said annulus and rotor for reciprocating said plungers and pistons, a sump in said housing containing a quantity of liquid, valves carried by said rotor and traversing said passages for variably controlling the flow of liquid therethrough between said cylinders, and means to conduct liquid from said sump into said cylinders.

6. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus journaled on said rotor rim whereby the annulus and rotor are arranged for relative rotational movement, a ring gear on and rotatable with said annulus, a center gear carried by and rotatable with said drive shaft, planet gears journaled on said rotor and meshing with said ring gear and center gear respectively, means for regulating the rotation of the ring gear relative to the center gear whereby said rotor will be revolved at an intermediate rotational speed, said means comprising plungers including separate pistons reciprocably movable in said cylinders to transfer liquid contained in said cylinders therebetween through said interconnecting passages, means actuated by relative rotary movement between said annulus and rotor for reciprocating said plungers and pistons, a sump in said housing containing a quantity of liquid, valves carried by said rotor and traversing said passages for variably controlling the flow of liquid therethrough between said cylinders, a conduit communicating with said cylinders and extending into said sump for conducting liquid from the sump into said cylinders, and means to limit flow of liquid in said conduit to one direction.

7. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus journaled on said rotor rim whereby the annulus and rotor are arranged for relative rotational movement, a ring gear on and rotatable with said annulus, a center gear carried by and rotatable with said drive shaft, planet gears journaled on said rotor and meshing with said ring gear and center gear respectively, means for regulating the rotation of the ring gear relative to the center gear whereby said rotor will be revolved at an intermediate rotational speed, said means comprising plungers including separate pistons reciprocably movable in said cylinders to transfer liquid contained in said cylinders therebetween through said interconnecting passages, rotary members journaled on said rotor and connected with and to reciprocate said plungers, means connecting said rotary members with and to be revolved by said annulus upon relative rotational movement between the rotary members and said annulus, and valves carried by the rotor and traversing said passages for variably controlling the flow of liquid therethrough between said cylinders.

8. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus journaled on said rotor rim whereby the annulus and rotor are arranged for relative rotational movement, a ring gear on and rotatable with said annulus, a center gear carried by and rotatable with said drive shaft, planet gears journaled on said rotor and meshing with said ring gear and center gear respectively, means for regulating the rotation of the ring gear relative to the center gear whereby said rotor will be revolved at an intermediate rotational speed, said means comprising plungers including separate pistons reciprocably movable in said cylinders to transfer liquid contained in said cylinders therebetween through said interconnecting passages, spur gears journaled on said rotor and having cranks thereon connected with and to reciprocate said plungers, means gearing said spur gears to and to be rotated by said annulus upon relative rotary movement between the rotor and annulus, and valves traversing said passages for variably controlling the flow of liquid therethrough between the cylinders.

9. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus journaled on said rotor rim whereby the annulus and rotor arranged for relative rotational movement, a ring gear on and rotatable with said annulus, a center gear carried by and rotatable with said drive shaft, planet gears journaled on said rotor and meshing with said ring gear and center gear respectively, means for regulating the rotation of the ring gear relative to the center gear whereby said rotor will be revolved at an intermediate rotational speed, said means comprising plungers including separate pistons reciprocably movable in said cylinders to transfer liquid contained in said cylinders therebetween through said interconnecting passages, spur gears journaled on said rotor and having cranks thereon connected with and to reciprocate said plungers, means gearing said spur gears to and to be rotated by said annulus upon relative rotary movement between the rotor and annulus, valves movable transversely through said passages for variably controlling the flow of liquid therethrough between the cylinders, and means extending externally of said housing for operating said valves.

10. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus concentric with said rotor and having a ring bushing journaled on said peripheral rim thereof, means for diametrically contracting said ring bushing around said rotor rim, a ring gear on and rotatable with said annulus, a center gear secured to and rotatable with said drive shaft, stud shafts carried by the rotor, planet gears journaled on said stud shaft and meshing with said ring gear and said center gear respectively, means for regulating the rotation of the ring gear relative to the center gear whereby said rotor will be revolved at an intermediate rotational speed, said means comprising pistons in said cylinders and reciprocable to transfer liquid contained in said cylinders therebetween through said interconnecting passages, plungers reciprocable in said cylinders to move said pistons, means actuated by relative rotary movement between said annulus and rotor for reciprocating said plungers, and valves, in said rotor and traversing said passages for variably controlling the flow of liquid therethrough between said cylinders.

11. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus concentric with said rotor and having a ring bushing journaled on said peripheral rim thereof, said bushing being split and having an outer peripheral surface formed by angularly intersecting planes, a flange and an associated ring carried by said annulus and provided with angularly related surfaces complementary with and engaging the angularly intersecting plane surfaces of said bushing, means to bring said flange and ring toward each other to radially compress said bushing about the rotor rim, a ring gear on and rotatable with said annulus, a center gear secured to and rotatable with said drive shaft, planet gears carried by said rotor and meshing with the ring gear and center gear respectively, plungers including separate pistons reciprocably movable in said cylinders to transfer liquid contained in said cylinders therebetween through said interconnecting passages, spur gears journaled on said rotor and having cranks thereon connected with and to reciprocate said plungers, a gear carried by said annulus and meshing with said spur gears to rotate the latter when the annulus is rotated relative to the rotor, valves in said rotor and movable transversely of said passages to constrict the latter and to regulate the flow of liquid therethrough, and means engaging said valves and extending exterior of said housing for operating said valves.

12. In a power transmission, a housing, relatively rotatable drive and driven shafts in said housing, a rotor on and rotatable with said driven shaft, said rotor having therein a plurality of axially radial cylinders and passages interconnecting adjoining cylinders of said plurality thereof, a peripheral rim on said rotor, an annulus concentric with said rotor and having a ring bushing journaled on said peripheral rim thereof, said bushing being split and having an outer peripheral surface formed by angularly intersecting planes, a flange and an associated ring carried by said annulus and provided with angularly related surfaces complementary with and engaging the angularly intersecting plane surfaces of said bushing, means to bring said flange and ring toward each other to radially compress said bushing about the rotor rim, a ring gear on and rotatable with said annulus, a center gear secured to and rotatable with said drive shaft, planet gears carried by said rotor and meshing with the ring gear and center gear respectively, plungers including separate pistons reciprocably movable in said cylinders to transfer liquid contained in said cylinders therebetween through said interconnecting passages, spur gears journaled on said rotor and having cranks thereon connected with and to reciprocate said plungers, a gear carried by said annulus and meshing with said spur gears to rotate the latter when the annulus is rotated relative to the rotor, a sump in said housing containing a quantity of liquid, a conduit associated with and extending from said rotor into said sump, said conduit being in communication with said passages so that liquid may flow from the sump into said passages, spring-pressed valves controlling the flow of liquid through said conduit, valve plungers slidable in said rotor and laterally traversing said passages, said valve plungers having therein triangularly-shaped ports adapted to be registered with the passages to permit liquid flow therethrough, means connecting the valve plungers together to be operated together, and means engaged with said plungers and extending exteriorly of said housing for operating said valve plungers.

FRANK G. MILES.

REFERENCES CITED

The following references are of record in the file of this patent:

UNITED STATES PATENTS

| Number | Name | Date |
|---|---|---|
| 1,610,457 | Lloyd | Dec. 14, 1926 |
| 2,102,131 | Schmid | Dec. 14, 1937 |
| 2,153,796 | Fletcher | Apr. 11, 1939 |
| 2,179,301 | Ronning | Nov. 7, 1939 |